US012784611B2

(12) United States Patent
Li et al.

(10) Patent No.: US 12,784,611 B2
(45) Date of Patent: Nov. 3, 2026

(54) MULTI-CHANNEL CLIENT EXPERIENCE TRAINING

(71) Applicant: FMR LLC, Boston, MA (US)

(72) Inventors: Pu Li, Southborough, MA (US); Pranay Tiwari, Auburndale, MA (US); Zequn Li, Paramus, NJ (US); Manish Pramod Worlikar, Flower Mound, TX (US)

(73) Assignee: FMR LLC, Boston, MA (US)

( * ) Notice: Subject to any disclaimer, the term of this patent is extended or adjusted under 35 U.S.C. 154(b) by 77 days.

(21) Appl. No.: 18/927,438

(22) Filed: Oct. 25, 2024

(65) Prior Publication Data

US 2026/0120587 A1 Apr. 30, 2026

(51) Int. Cl.
*G09B 9/00* (2006.01)
*G06N 3/091* (2023.01)
*G06N 20/00* (2019.01)

(52) U.S. Cl.
CPC ............... *G09B 9/00* (2013.01); *G06N 3/091* (2023.01); *G06N 20/00* (2019.01)

(58) Field of Classification Search
CPC ........... G09B 9/00; G06F 16/35; G06F 40/30; G06N 3/091; G06N 20/00
See application file for complete search history.

(56) References Cited

U.S. PATENT DOCUMENTS

| | | | | |
|---|---|---|---|---|
| 8,156,060 | B2 * | 4/2012 | Borzestowski | G06N 5/04 706/45 |
| 12,631,897 | B2 * | 5/2026 | Qiao | G02B 30/36 |
| 2021/0201192 | A1 * | 7/2021 | Kim | G06N 3/006 |
| 2023/0036730 | A1 * | 2/2023 | Casa | G06Q 20/363 |
| 2026/0105546 | A1 * | 4/2026 | Joshi | G06Q 10/06398 |
| 2026/0151184 | A1 * | 6/2026 | Hwang | A61B 34/10 |
| 2026/0155218 | A1 * | 6/2026 | Browder | G16H 10/60 |

* cited by examiner

*Primary Examiner* — Kang Hu
(74) *Attorney, Agent, or Firm* — Cesari and McKenna, LLP

(57) ABSTRACT

A computerized method is provided for leveraging generative AI and large language models to create and implement a client experience associate training system. Reinforcement learning from human and other feedback can be used to generate the training simulator for a variety of specific service groups. Systems and methods can include a training program building component operable to build a training program using AI and/or LLMs from the uploaded training materials of various file types. In some embodiments, systems and methods can include running the training program, after building, to simulate customer interactions across a variety of channels including chat, voice, video and email. In some embodiments, the training program can automatically evaluate the trainee response and provide coaching tips.

20 Claims, 7 Drawing Sheets

201

MULTI-CHANNEL CLIENT EXPERIENCE TRAINING

TECHNICAL FIELD

This application relates generally to systems, methods, and apparatuses, including computer program products, for generative AI-based, multi-channel, intelligent client experience training.

BACKGROUND

In many service-based industries, including financial services, client experience associates act as the client-facing representatives of the company. They are most often the point of contact through which a customer interacts with the company and, as such, play a crucial role in ensuring that clients have a positive and smooth interaction with the service provider. Client experience associates play roles in several areas including: Client retention by ensuring a positive client experience can lead to higher client retention rates, as satisfied clients are more likely to stay with a financial institution; Reputation and trust as a positive experience builds trust and a good reputation for the financial institution, attracting new clients and fostering long-term relationships; Compliance and regulatory requirements as client experience associates often help ensure that clients' needs and inquiries are met in compliance with financial regulations, reducing the risk of legal issues; Cross-selling opportunities because satisfied clients are more open to considering additional financial products and services, increasing revenue opportunities; and Feedback and improvement because client experience associates can gather valuable feedback, helping the institution identify areas for improvement and refine their services to meet client expectations.

To ensure that client experience associates provide the best client interaction experience, proper training is crucial. But in the many industries, client experience associates have a high turnover rate and associate training can be expensive and time consuming. Companies can spend a lot of time and money training client experience associates only to have them leave the company shortly thereafter, necessitating the training of new associates.

SUMMARY

Systems and methods of the invention provide a dynamic, adaptive, comprehensive, and intelligent training system for client experience associates that can simulate real-world scenarios with high fidelity. The training programs described herein provide real-time, adapting learning experiences including a variety of types and formats of training materials while being tailored to specific business requirements. They also provide comprehensive coverage of potential client experience interactions, considering the diversity in potential queries and issue types; consistent and objective evaluation of training performances free from human bias; and integrate up-to-date company policies and procedures and call transcripts with survey feedback into a seamless and interactive question-answer format. Systems and methods described herein leverage an artificial intelligence-based approach to save costs while delivering effective training thereby addressing the problems with many existing training programs, especially in high-turnover industries.

In various embodiments, training systems and methods described herein provide functional components including multi-channel conversation simulation including chat, audio, video, and email; integration of service tools during the conversation simulation to teach associates proper use of the tools during the client interaction; and an automatic scoring system with coaching tips.

Aspects of the invention can include a computerized method for training client experience associates with the method comprising training, on a computing device comprising a processor in communication with a non-transient memory, a large language model (LLM)-based natural language generation model with a plurality of client experience training materials. Training can include converting the plurality of client experience training materials into plain text data using a data ingestion and preprocessing module; partitioning large portions of the plain text data into small portions using a text chunking and partition module and providing the small portions to the LLM-based natural language generation model; developing curated prompts to the LLM-based natural language generation model using a prompt engineering module; generating question-answer pairs related to client experience training using a question answer generation module comprising the LLM-based natural language generation model; and evaluating generated question relevance, generated answer quality, and content coverage of the generated question-answer pairs using a question answer evaluation module and removing question-answer pairs having an answer quality score below a selected threshold to create a question-answer pairs pool. Text chunking and partitioning can include analyzing the structure of a document (e.g., a PDF, PPTX, or DOCX file) to identify sections. For example, each PDF page or PPTX slide may constitute a section, while DOCX sections may be defined by headings and subheadings. The text can be partitioned into smaller chunks, ensuring each chunk contains no more than 1,000 to 2,000 tokens (words) for contextual coherence. In various embodiments, a recursive text splitter may be used that is parameterized by a list of characters such as ["\n\n", "\n", ".", "?"]. Such a splitter can be used to divide the text based on those characters, in order, until the chunks reach the threshold size while keeping paragraphs, sentences, and words together as much as possible to maintain semantic integrity.

Methods can include further include teaching a client experience associate, wherein teaching comprises simulating customer interactions using an interactive simulation module and the question-answer pairs pool to pose questions to the client experience associate; receiving, analyzing, and scoring responses from the client experience associate using a user response scoring module to compare the responses to validated answers from the question-answer pairs pool; providing feedback to the client experience associate using a user response feedback module based on differences between the responses and the validated answers identified by the user response scoring module; and tracking the client experience associate's progress over time using a user performance tracking module.

In certain embodiments, the plurality of client experience training materials can comprise unstructured document formats. The plurality of client experience training materials may comprise a plurality of formats. The plurality of formats can comprise at least two of HyperText Markup Language (HTML), Word Document (DOCX), and OneNote files (ONE), and Portable Document Format (PDF). In some embodiments, evaluating generated question relevance can include semantic similarity computation, comprising calculating semantic similarities between the plurality of client experience training materials and the generated questions, and calculating semantic similarities among all pairs of generated questions and question ranking using a Maximal Marginal Relevance (MMR) algorithm.

Evaluating generated answer quality can include providing a second large language model with a generated question-answer pair and policy content from the plurality of client experience training materials referenced by the generated question-answer pair and prompting the second large language model to grade the generated question-answer pair on relevance, correctness, completeness, informativeness, quality, coherence, and attributability.

Evaluating content coverage can include using natural language processing of the plurality of client experience training materials to identify key words and phrases that capture central themes of the plurality of client experience training materials; identifying topics that are not addressed by the generated question answer pairs using a comparative analysis between the identified key words and phrases and the question-answer pairs; and prompting the question-answer generation module to produce additional question-answer pairs targeting the identified topics. The plurality of client experience training materials can comprise real-world client experience interactions and interaction survey data from the real-world client experience interactions.

In certain embodiments, methods can include training a supervised learning reward model using the real-world client experience interactions and interaction survey data; assessing the generated question-answer pairs with the supervised learning reward model to assign a reward value for each generated question-answer pair; and prioritizing generated question-answer pairs within the question-answer pairs pool by assigned reward value. In some embodiments, the real-world client experience interactions can comprise audio or video and the user response scoring module analyzes voice patterns, facial expressions, or body movements in the responses from the client experience associate based using the trained learning reward model.

In some embodiments, tracking user progress can include recording scores from the user response scoring module and feedback from the user response feedback module from a plurality of training sessions performed by a single client experience associate over time to identify improvement by the single client experience associate. The interactive simulation module can provide questions in a format selected from the group consisting of a chat interface, a voice interface, and a video interface.

In certain aspects, systems of the invention can include a computer system for training client experience associates. The system can comprise a processor in communication with a non-transient memory and operable to perform the steps of training a large language model (LLM)-based natural language generation model with a plurality of client experience training materials and teaching a client experience associate. Training the LLM-based natural language generation model can include: converting the plurality of client experience training materials into plain text data using a data ingestion and preprocessing module; partitioning large portions of the plain text data into small portions using a text chunking and partition module and providing the small portions to the LLM-based natural language generation model; developing curated prompts to the LLM-based natural language generation model using a prompt engineering module; generating question-answer pairs related to client experience training using a question answer generation module comprising the LLM-based natural language generation model; and evaluating generated question relevance, generated answer quality, and content coverage of the generated question-answer pairs using a question answer evaluation module and removing question-answer pairs having an answer quality score below a selected threshold to create a question-answer pairs pool.

In various embodiments, teaching the client experience associate can include: simulating customer interactions using an interactive simulation module and the question-answer pairs pool to pose questions to the client experience associate; receiving, analyzing, and scoring responses from the client experience associate using a user response scoring module to compare the responses to validated answers from the question-answer pairs pool; providing feedback to the client experience associate using a user response feedback module based on differences between the responses and the validated answers identified by the user response scoring module; and tracking the client experience associate's progress over time using a user performance tracking module.

In various embodiments systems of the invention can be operable to perform any and all of the aforementioned methods.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
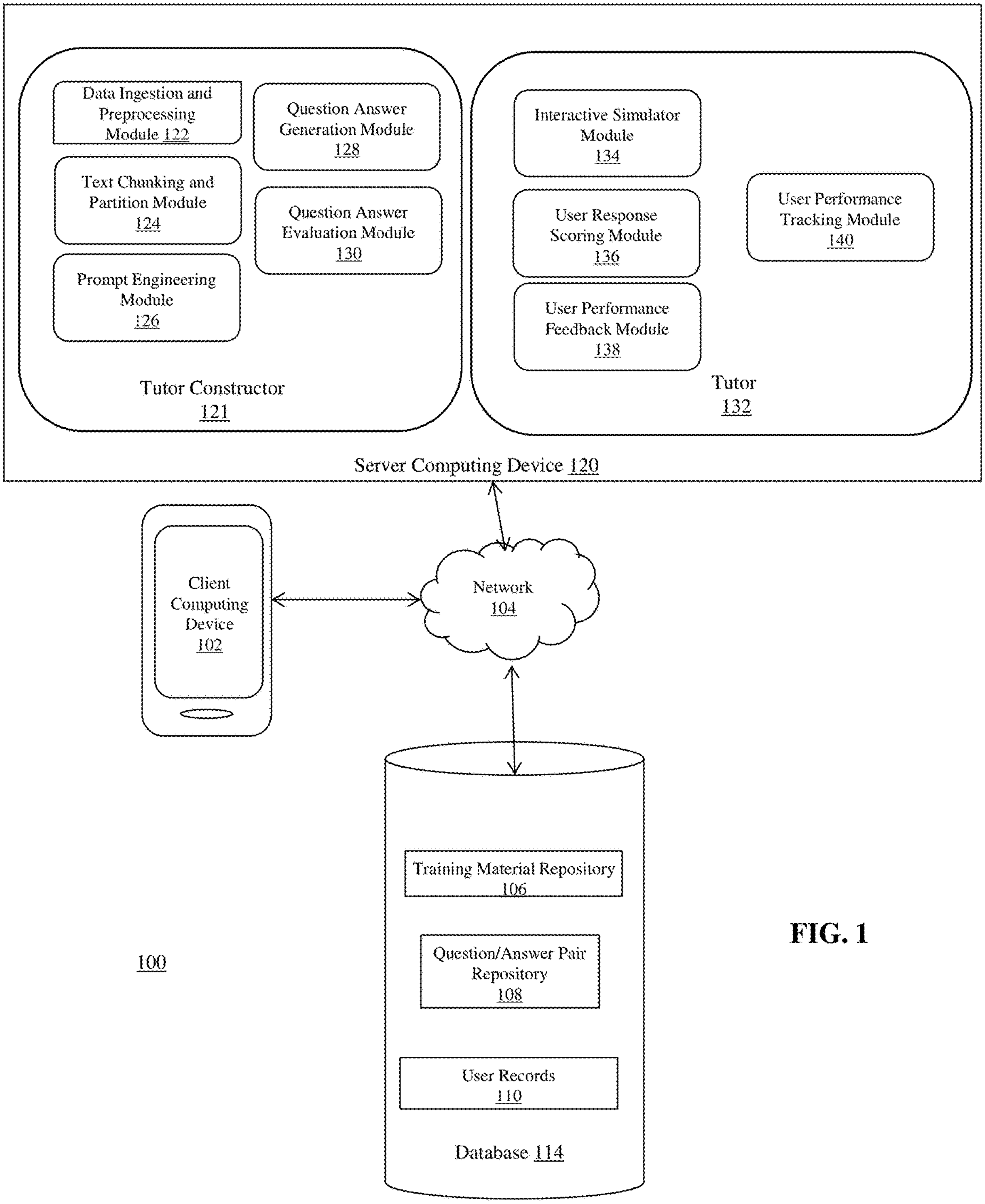
FIG. 1 is a block diagram of a system for training client experience associates.

FIG. 1 is a block diagram of an exemplary system 100 for training client experience associates. The system 100 includes a client computing device 102, a communications network 104, a server computing device 120 that includes a tutor constructor application 121 and one or more tutor applications 132. The system 100 also includes a database 114 storing a training material repository 106, a question/answer pair repository 108, and user records 110.

The client computing device 102 connects to one or more communications networks (e.g., network 104) in order to communicate with the server computing device 120 to provide input and receive output relating to client experience agent training. Administrators, trainees, and/or other users may interact with the tutor constructor application 121 and/or the tutor application 132 via a client computing device 102. For example, a user interface displayed on the client computing device 102 and/or one or more input/output devices can allow an administrator to provide training materials to the tutor constructor application 121, review question-answer pairs and tutor models and manage settings for the tutor construction process, among other actions. A user interface displayed on the client computing device 102 and/or one or more input/output devices may allow a trainee to interact with various simulations and training sessions and review scores and feedback in the tutor application 132, among other actions.

Figure 4:
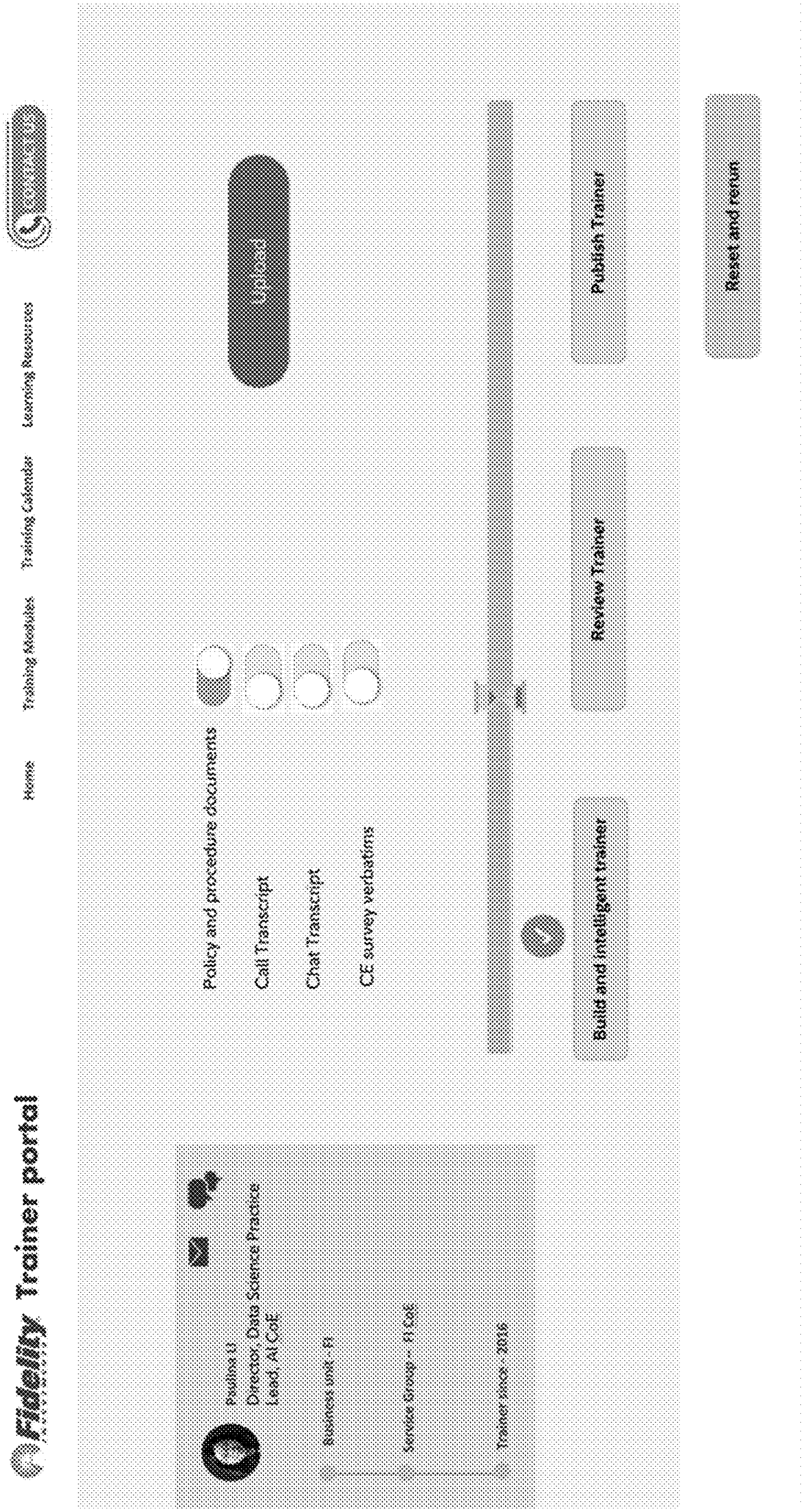
FIG. 4 illustrates an exemplary user interface for administrators of a tutor constructor application.

An exemplary user interface for a tutor constructor application 121 is shown in FIG. 4. The administrator is able to upload training documents, build a tutor application, review tutor applications in the build process, and/or publish the completed tutor application(s) 132. The administrator may also manage training sessions for trainees through a calendar as well as review results of those sessions for trainee evaluations.

Returning to FIG. 1 Exemplary client computing devices 102 include but are not limited to server computing devices, desktop computers, laptop computers, tablets, mobile devices, smartphones, and the like. Typically, the client computing device 102 includes a display device (not shown) that is embedded in and/or coupled to the client computing device for the purpose of displaying information to a user of the device. It should be appreciated that other types of computing devices that are capable of connecting to the components of the system 100 can be used without departing from the scope of invention. Although FIG. 1 depicts one client computing device 102, it should be appreciated that the system 100 can include any number of client computing devices.

In some embodiments, the client computing device 102 can execute one or more software applications that are used in conjunction with applications or modules on the server computing device 120. For example, the client computing device 102 can be configured to execute one or more native applications and/or one or more browser applications. Generally, a native application is a software application (in some cases, called an 'app') that is installed locally on the client computing device 102 and written with programmatic code designed to interact with an operating system that is native to the client computing device 102. Such software may be available from, e.g., the Apple® App Store, the Google® Play Store, the Microsoft® Store, or other software download platforms depending upon, e.g., the type of device used. In some embodiments, the native application includes a software development kit (SDK) module that is executed by a processor of the client computing device 102 to perform functions (e.g., execute training sessions or review scores). Generally, a browser application comprises software executing on a processor of the client computing device 102 that enables the client computing device to communicate via HTTP or HTTPS with remote servers addressable with URLs (e.g., server computing device 120) to receive website-related content, including one or more webpages, for rendering in the browser application and presentation on the display device coupled to the client computing device 102. Exemplary mobile browser application software includes, but is not limited to, Firefox™, Chrome™, Safari™, and other similar software. The one or more webpages can comprise visual and audio content for display to and interaction with a user.

The communications network 104 enables the client computing device 102 to communicate with the server computing device 120 and the database 114 in certain embodiments. The network 104 is typically comprised of one or more wide area networks, such as the Internet and/or a cellular network, and/or local area networks. In some embodiments, the network 104 is comprised of several discrete networks and/or sub-networks (e.g., cellular to Internet).

The server computing device 120 is a device including specialized hardware and/or software modules that execute on a processor and interact with memory modules of the server computing device 120, to receive data from other components of the system 100, transmit data to other components of the system 100, and perform functions (e.g., train or generate a tutor via the tutor constructor application 121 and execute training via the tutor application 132). As discussed above the server computing device 120 includes the tutor constructor application 121 and any number of tutor applications 132 which may be generated or modified by the tutor constructor application 121. The tutor constructor application 121 can include a data ingestion and preprocessing module 122, a text chunking and partition module 124, a prompt engineering module 126, a question answer generation module 128 and a question answer evaluation module 130. The tutor application 132 can include an interactive simulator module 134, a user response scoring module 136, a user performance feedback module 138, and a user performance tracking module 140. The various modules of the tutor constructor application 121 and tutor application(s) 132 are discussed in more detail below. The server computing device may include any number of other programs that may execute on the processor of the server computing device 120 and may each, despite being disparate programs, rely on a regular exchange of data between them and/or the database 114. In some embodiments, the various modules, programs, or applications are specialized sets of computer software instructions programmed onto one or more dedicated processors in the server computing device 120 and can include specifically designated memory locations and/or registers for executing the specialized computer software instructions.

Although the applications and modules are shown in FIG. 1 as executing within the same server computing device 120, in some embodiments the functionality of the applications and modules can be distributed among a plurality of server computing devices. It should be appreciated that any number of computing devices, arranged in a variety of architectures, resources, and configurations (e.g., cluster computing, virtual computing, cloud computing) can be used without departing from the scope of the invention. The exemplary functionality of the applications, programs, and/or modules is described in detail throughout this specification.

The database 114 is a computing device (or in some embodiments, a set of computing devices) coupled to the server computing device 120 and is configured to receive, generate, and store specific segments of data relating to client or customer experience associate training. In some embodiments, all or a portion of the database 114 can be integrated with the server computing device 120 or be located on a separate computing device or devices. The database 114 can comprise one or more databases configured to store portions of data used by the other components of the system 100, as will be described in greater detail below.

In some embodiments, the database 114 comprises one or more training material repositories 106 storing various training materials of potentially different file types relating to client experience associates. These materials can include reference materials, behavioral guides, call scripts, and/or any other materials relevant to client experience training. The database 114 can also include a question/answer pair repository 108 wherein any question answer pairs generated by the question answer generation module 128 may be stored.

The database 114 can include one or more user records 110 that relate to trainee progress in the tutor application 132. This information can be created, stored, and accessed by, for example, the user response scoring module 136, the user performance feedback module 138, and the user performance tracking module 140.

Figure 2:
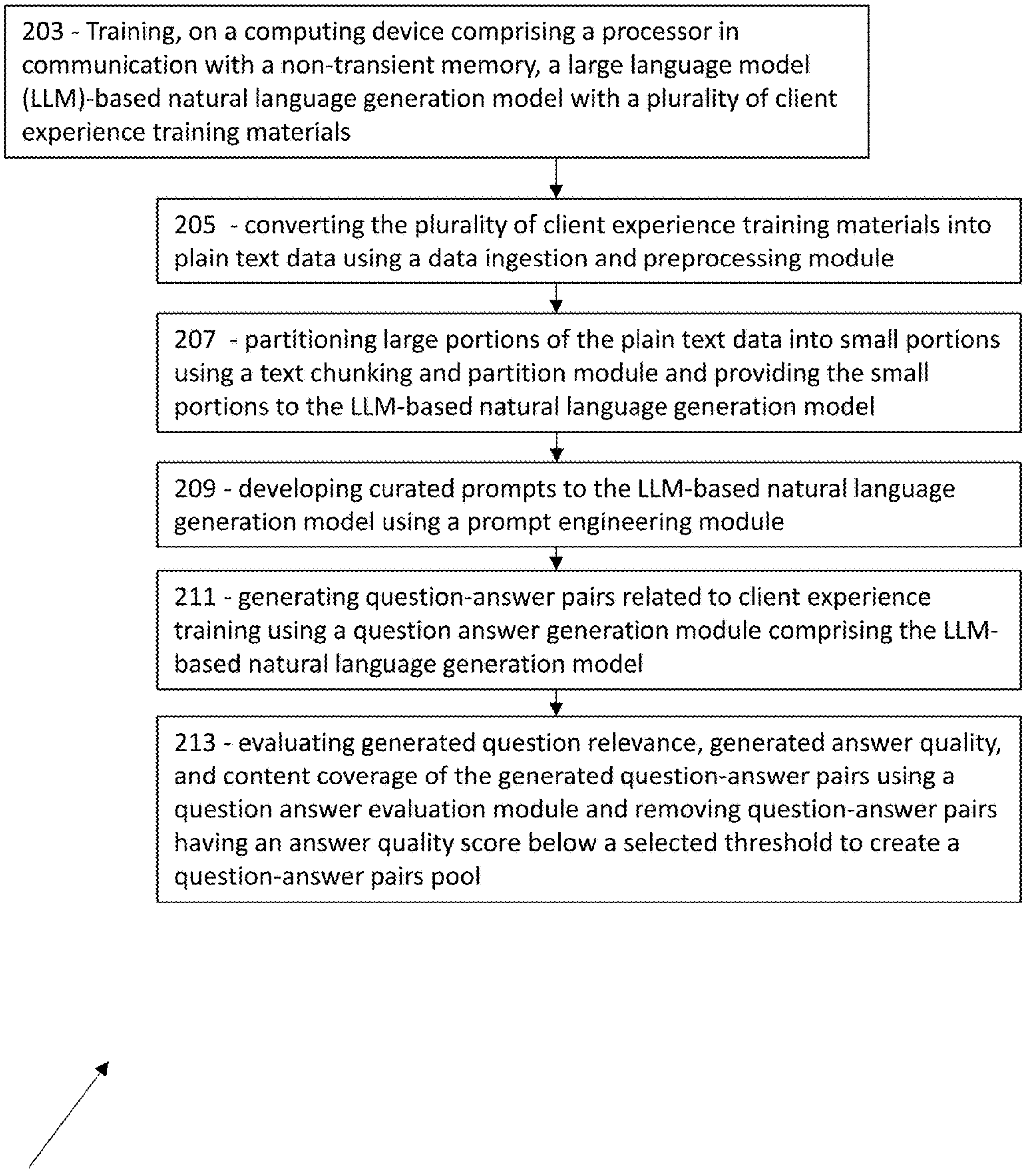
FIG. 2 shows an exemplary method for building a client experience associate tutor application.

FIG. 2 shows an exemplary method 201 for creating a client experience associate training application. A large language model (LLM)-based natural language generation model is trained 203, on a computing device comprising a processor in communication with a non-transient memory, with a plurality of client experience training material. The training 205 can include converting 205 the plurality of client experience training materials into plain text data using a data ingestion and preprocessing module. Large portions of the plain text data are partitioned 207 into small portions using a text chunking and partition module and providing the small portions to the LLM-based natural language generation model. Curated prompts to the LLM-based natural language generation model are developed 209 using a prompt engineering module. Question-answer pairs related to client experience training are generated 211 using a question answer generation module comprising the LLM-based natural language generation model. The generated question relevance, generated answer quality, and content coverage can then be evaluated 213 for the generated question-answer pairs using a question answer evaluation module and question-answer pairs having an answer quality score below a selected threshold can be removed to create a question-answer pairs pool of the remaining question-answer pairs.

Figure 3:
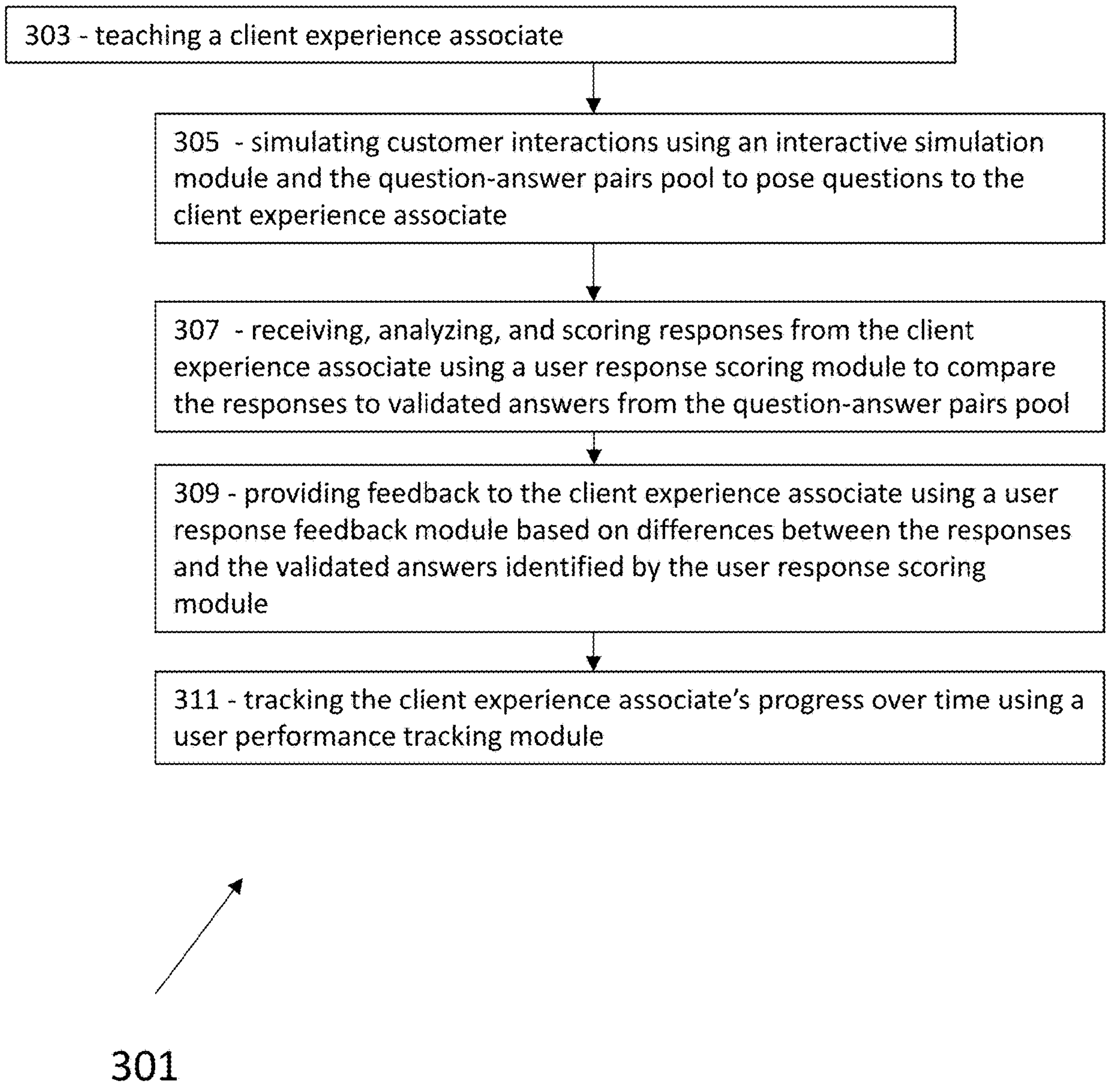
FIG. 3 shows an exemplary method for training client experience associates using a tutor application.

FIG. 3 shows an exemplary method 301 for teaching a client experience associate using the trained tutor application. Customer interactions are simulated 305 using an interactive simulation module and the question-answer pairs pool to pose questions to the client experience associate. Responses from the client experience associate are then received, analyzed, and scored 307 using a user response scoring module to compare the responses to validated answers from the question-answer pairs pool. Feedback can then be provided 309 to the client experience associate using a user response feedback module based on differences between the responses and the validated answers identified by the user response scoring module. The client experience associate's progress can also be tracked 311 over time using a user performance tracking module.

In various embodiments, as discussed above, artificial intelligence-based training systems and methods can consist of two components: an AI Trainer Constructor or tutor constructor application and an Interactive AI Trainer or tutor application.

The AI Tutor Constructor can be designed for a client experience team leader and training facilitators to create an AI tutor for their service team. It can use large language model-based natural language generation to analyze training material and develop training simulators. This tool can accept a wide range of unstructured training material of various formats such as HyperText Markup Language (HTML), Word Document (DOCX), and OneNote files, etc. and generate high-quality question answer pairs that provide engaging learning experience for associates and analysts.

Figure 5:
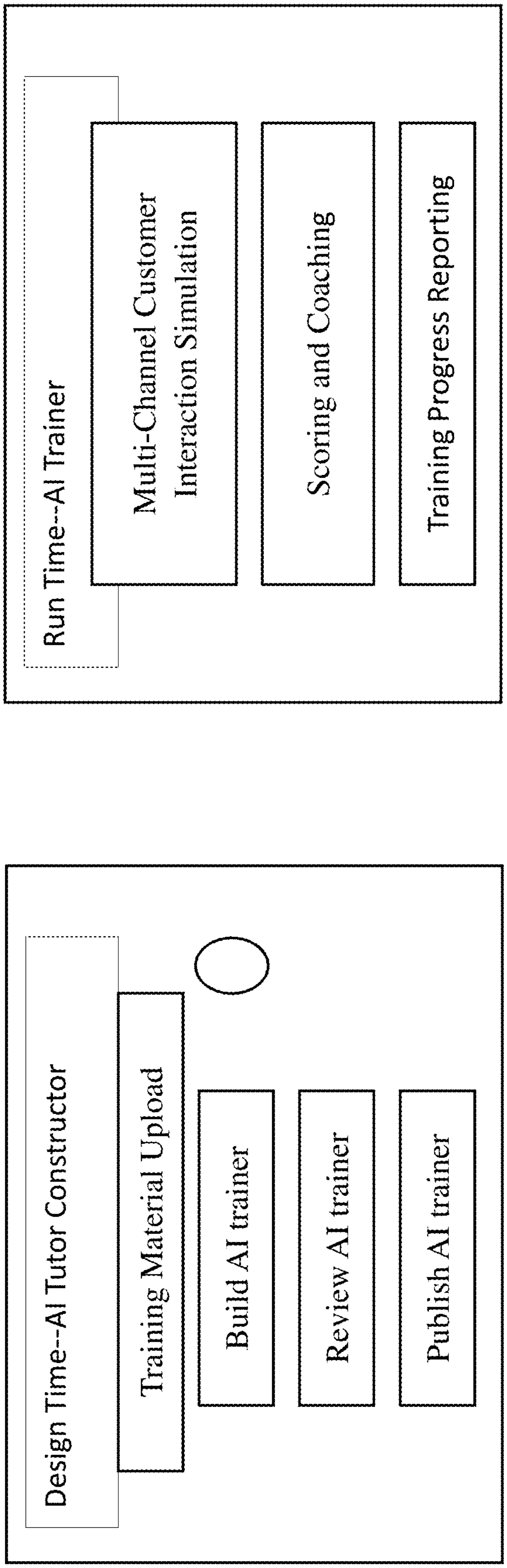
FIG. 5 illustrates high level components of tutor constructor and tutor applications according to various embodiments.

The Interactive AI Trainer or tutor can be designed to provide client experience team members with an immersive conversational experience resembling actual customer interactions. The AI trainer with access to validated high quality question answer pairs can act as a real customer by simulating a variety of interactions across different channels (e.g., voice, text chat, or email) to test a trainee user's knowledge and improve the user's understanding by using a real-time scoring system with coaching tips and recommendations. FIG. 5 illustrates high level components of tutor constructor and tutor applications according to various embodiments.

In various embodiments, an AI Tutor Constructor can consist of the follow modules. A Data Ingestion and Preprocessing module can ingest multitudes of unstructured documents formats (e.g., HTML, DOCS, OneNote, etc.), preprocess, and convert them into plain text. A Text Chunking and Partition module can decompose large text corpora into smaller, manageable sections to ensure efficient use of context window for downstream question answer generation. A Prompt Engineering module can involve the development of curated instruction (i.e., prompts) to large language models to effectively generate high-quality question-answer pairs as training material. The prompt selector can intelligently choose the best prompt in store that suits user's need and document type. An exemplary prompt is below:

Act as a Content writer and reviewer

Objective: Your task is to curate a few question answer pairs from the Content

Content: {context}

Requirements:

The generated questions should have enough context to disambiguate.

The generated questions should in the voice of real advisor customers and short

The generated questions and answers should have full coverage of the content.

Always start a question with Q: and start an answer with A.

Limit to How to and What questions, do not generate questions with No as answers.

Figure 6:
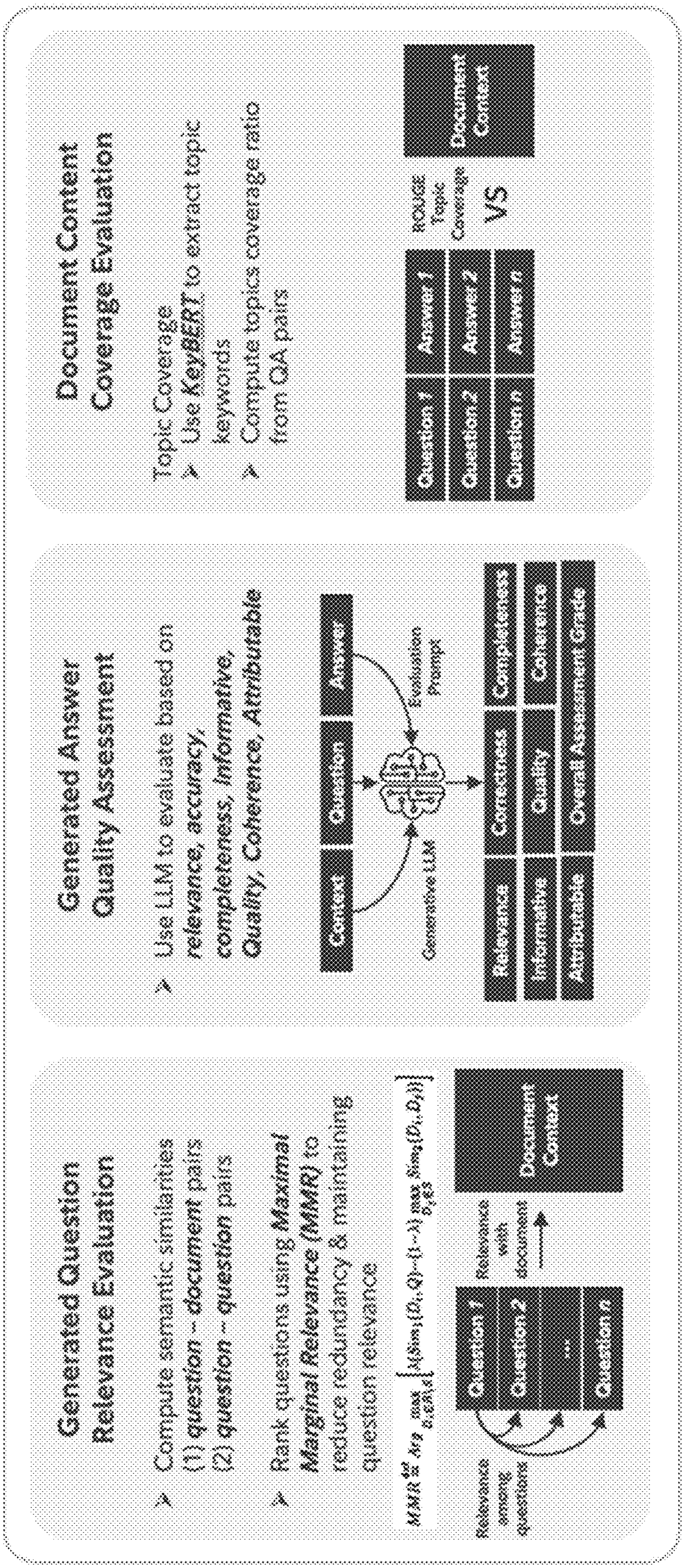
FIG. 6 illustrates components of an exemplary Question Answer Evaluation module.

Based on the content above, generate questions and answers:

A Question Answer Generation module can apply state-of-the-art large language model(s) that have been fine-tuned to generate question-answer pairs that accurately reflect real-world scenarios. A Question Answer Evaluation module can comprehensively evaluate the performance of generated question answer pairs, focusing on three key aspects including generated question relevance, generated answer quality, and content coverage. Question answer pair with low quality score is removed during the process. FIG. 6 illustrates components of an exemplary Question Answer Evaluation module. As shown, question-answer evaluation can include three components: evaluation of relevance, quality, and coverage. In various embodiments, for the evaluation of relevance: the first step the evaluation process can confirm the relevance of the generated question to its corresponding training document. To achieve this, the evaluation model can employ a two-step process:

Step One—Semantic Similarity Computation: The model first calculates the semantic similarities between the document context and the generated questions, and then calculates semantic similarities among all pairs of generated questions. This step can include the use of a custom sentence embedding model to identify and measure the degree of sematic similarity.

Step Two—Question Ranking via Maximal Marginal Relevance (MMR): Following the computation of semantic similarities, the model can utilize a Maximal Marginal Relevance (MMR) algorithm. The MMR algorithm serves to rank the generated questions, balancing the diversity and relevance of these questions. This ensures that the questions produced are not only diverse but also closely tied to the original document context.

Quality evaluation of the generated answers can be performed next. To accomplish this, a large language model can be used as an evaluator, grading the generated answers based on a predefined rubric containing multiple binary (Yes/No) criteria. The model may be prompted with a question and a reference answer. An example of such a prompt is delineated below:

As an AI specializing in operations policy and procedure evaluation, analyze the provided answer to the given question based on the policy content.

Follow the criteria and format below for your evaluation.

Criteria:

Relevance: Is the answer relevant to the question above and does not include irrelevant topics?

Correctness: Is the answer factually accurate based on policy content?

Completeness: Does the answer provide sufficient information to answer the question fully based on policy content.

Informative: Is the answer an informative summary captures the important information in the content and presents it accurately and concisely?

Quality: IS the answer a high-quality summary that is comprehensible and understandable?

Coherence: Is the answer a coherent summary that is well-structured and well-organized?

Attributable: Is all the information in the answer fully attributable to the content?

Policy Content: {content}

Question: {question}

Answer: {answer}

Provide your evaluation in the following format:

Relevance: [Yes or No, with justification]

Correctness: [Yes or No, with justification]

Completeness: [Yes or No, with justification]

Informative: [Yes or No, with justification]

Quality: [Yes or No, with justification]

Coherence: [Yes or No, with justification]

Attributable: [Yes or No, with justification]

Grade: [0-10 out of 10, based on the assessments of the above criteria]

Evaluation of Content Coverage:

The last step of the exemplary evaluation process focuses on the content coverage of the generated question-answer pairs. This phase can ensure that the generated pairs encompass all essential topics derived from the document material. The multi-step process ensures that the generated question-answer pairs effectively cover the entirety of the document material, leaving no key topic unaddressed. By leveraging advanced extraction techniques and employing a thorough comparison process, this evaluation module can ensure that the trainee obtains a comprehensive understanding of the material through the generated question-answer pairs.

Evaluating Content Coverage can Include the Following Steps:

Keyword and Key Phrase Extraction: The evaluation module applies advanced keyword and key phrase extraction techniques to identify the crucial topics from the document. This can involve using natural language processing techniques to pinpoint the most meaningful words and phrases that encapsulate the central themes of the document.

Identification of Missed Topics: Following the extraction process, the evaluation module can identify any important topics that are not addressed by the generated question-answer pairs. This involves a comparative analysis between the extracted keywords and key phrases and the content of the question-answer pairs.

Prompting for Additional Question-Answer Pairs: If any key topics are identified as missing from the generated pairs, the evaluation module can prompt the Question-Answer Generation module to produce additional pairs. These new pairs should be specifically designed to address the previously unaccounted—for topics, ensuring comprehensive coverage of the document material.

In various embodiments, question-answer pair evaluation can include a human validation component. Such a component represents a human-in-loop review and validation process, with team leaders reviewing the generated question-answer pairs, adding a layer of human insight and validation to the system's output, ensuring that AI generated output always remains grounded in the practical realities of human learning.

If interaction survey data is available it may be uploaded to the Tutor Constructor tool and can trigger a RLHF (Reinforcement Learning from Human Feedback) process. The reinforcement learning process can try to update the LLM parameters to maximize the accumulated reward or minimize the reward difference between a preferred response and a LLM generated response.

The reward model can be used to direct ways in which the LLM parameters should be updated. The reward model may be used to classify the outputs of the LLM and evaluate how the generated response aligns with human preferences.

In some embodiments, real client survey data may be used to train a supervised learning reward model. The survey data can include curated conversation transcripts including client questions, agent responses, and client feedback to the answer. The feedback can be as simple as positive or negative or may be more detailed. In various embodiments, client responses can be determined automatically through analysis of facial expressions or voice patterns to associate positive or negative emotions with the experience using known analysis programs.

Figure 7:
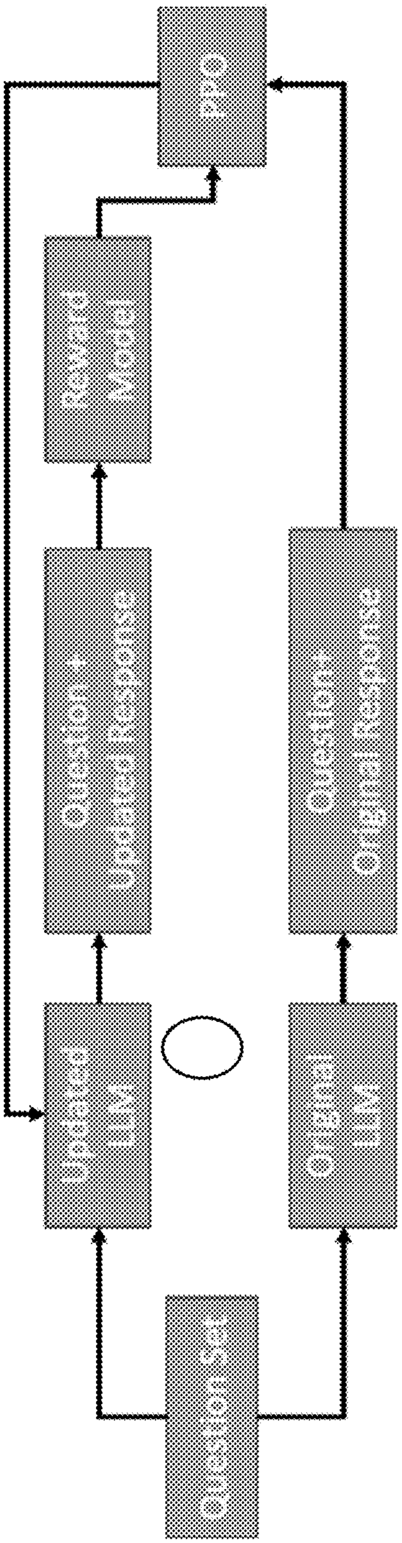
FIG. 7 illustrates a high-level flow diagram of an exemplary reinforcement learning process.

Once the reward model is trained, it can be used to assess the output of the LLM and assign a reward value for each LLM output. A Proximal Policy Optimization (PPO) algorithm can be used for reinforcement learning. The PPO can allow the use of a 'clipping' mechanism, so the policy (in this case, the LLM) update will be constrained to a 'proximal region' to prevent dramatic changes to the generated response distribution, by adding a divergence shift penalty between the original LLM and the updated LLM. FIG. 7 illustrates a high-level flow diagram of an exemplary reinforcement learning process.

As discussed above, in certain embodiments, an interactive AI tutor application can consist of the following modules:

An Interactive Simulation Module: This component can be responsible for simulating real customer interactions. It uses the question answer pairs generated by the AI Tutor Constructor to provide a realistic and engaging learning experience.

A User Response Scoring Module: This module can receive the responses provided by the users during the simulation. It then analyses these responses, comparing them against the validated answers from the AI Tutor Constructor and scores the user's responses based on their comparison with the validated answers.

A User Response Feedback Module: This module may be responsible for providing feedback and coaching tips and recommendations for improvement to help users learn and grow.

A User Performance Tracking Module: This module can track the user's progress over time, keeping a record of the scores, feedback, and improvements. It uses this data to provide insights into the user's strengths, weaknesses, and overall growth.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

EXAMPLES

Example 1—Practical Results from the Implementation of the Question-Answer Evaluation Module A practical application of the evaluation module was conducted on question-answer pairs generated from internal operations policies, using the framework outlined above.

Question relevance scores: the average cosine similarity between the question and context embeddings was 0.81. This high score indicates that the generated questions were highly relevant to the context of the operations policies.

Answer quality scores: the large language model evaluated the quality of the generated answers based on seven criteria: relevance, accuracy, completeness, informativeness, quality, coherence, and attributability. The average scores are Relevance (99.7%), Accuracy (94.7%), Completeness (67.1%), Informative (91.3%), Quality (95.3%), Coherence (99.9%), Attributability (99.5%).

The overall quality of the answers was rated as 8.9 out of 10, indicating a high level of quality in the generated answers.

To further demonstrate the effectiveness of the evaluation module, these generated question-answer pairs underwent rigorous review and validation process conducted by Subject Matter Experts (SMEs). The SMEs' evaluation demonstrates high correlation with the answer quality scores from the evaluation module:

Accepted question-answer pairs: approximately 69.2% of the question-answer pairs were accepted by the SMEs, from which 54.6% of the question-answer pairs were accepted without any required updates. These pairs had an average answer quality score of 9.95, indicating near-perfect quality according to the SME, while 14.6% of the question-answer pairs were accepted but required minor updates. These pairs still had a high average answer quality score of 9.80, affirming their overall quality and relevance.

Unselected question-answer pairs: approximately 31.7% of the question-answer pairs were not selected by the SMEs, despite having a high average answer quality score of 9.68. The SMEs clarified that the unselected pairs were neither inaccurate nor of poor quality. They were not selected because they were either out of the scope of the SMEs' daily procedures or were considered too simple (e.g., related to definitions).

The positive correlation between the answer quality scores generated by the module and SME approval demonstrates the empirical results which attests module's ability to evaluate quality of generated question-answer pairs.

What is claimed is:

1. A computerized method for training client experience associates, the method comprising:

Training, on a computing device comprising a processor in communication with a non-transient memory, a large language model (LLM)-based natural language generation model with a plurality of client experience training materials, wherein training comprises:

converting the plurality of client experience training materials into plain text data using a data ingestion and preprocessing module;

partitioning large portions of the plain text data into small portions using a text chunking and partition module and providing the small portions to the LLM-based natural language generation model;

developing curated prompts to the LLM-based natural language generation model using a prompt engineering module;

generating question-answer pairs related to client experience training using a question answer generation module comprising the LLM-based natural language generation model; and evaluating generated question relevance, generated answer quality, and content coverage of the generated question-answer pairs using a question answer evaluation module and removing question-answer pairs having an answer quality score below a selected threshold to create a question-answer pairs pool; and teaching a client experience associate, wherein teaching comprises:

simulating customer interactions using an interactive simulation module and the question-answer pairs pool to pose questions to the client experience associate;

receiving, analyzing, and scoring responses from the client experience associate using a user response scoring module to compare the responses to validated answers from the question-answer pairs pool;

providing feedback to the client experience associate using a user response feedback module based on differences between the responses and the validated answers identified by the user response scoring module; and tracking the client experience associate's progress over time using a user performance tracking module.

2. The computerized method of claim 1, wherein the plurality of client experience training materials comprise unstructured document formats.

3. The computerized method of claim 1, wherein the plurality of client experience training materials comprise a plurality of formats.

4. The computerized method of claim 3, wherein the plurality of formats comprise at least two of HyperText Markup Language (HTML), Word Document (DOCX), and OneNote files (ONE), and Portable Document Format (PDF).

5. The computerized method of claim 1, wherein evaluating generated question relevance comprises:

semantic similarity computation, comprising calculating semantic similarities between the plurality of client experience training materials and the generated questions, and calculating semantic similarities among all pairs of generated questions; and question ranking using a Maximal Marginal Relevance (MMR) algorithm.

6. The computerized method of claim 1, wherein evaluating generated answer quality comprises:

providing a second large language model with a generated question-answer pair and policy content from the plurality of client experience training materials referenced by the generated question-answer pair; and prompting the second large language model to grade the generated question-answer pair on relevance, correctness, completeness, informativeness, quality, coherence, and attributability.

7. The computerized method of claim 1, wherein evaluating content coverage comprises:

using natural language processing of the plurality of client experience training materials to identify key words and phrases that capture central themes of the plurality of client experience training materials;

identifying topics that are not addressed by the generated question-answer pairs using a comparative analysis between the identified key words and phrases and the question-answer pairs; and prompting the question-answer generation module to produce additional question-answer pairs targeting the identified topics.

8. The computerized method of claim 1, wherein the plurality of client experience training materials comprises real-world client experience interactions and interaction survey data from the real-world client experience interactions.

9. The computerized method of claim 8, further comprising:

training a supervised learning reward model using the real-world client experience interactions and interaction survey data;

assessing the generated question-answer pairs with the supervised learning reward model to assign a reward value for each generated question-answer pair;

prioritizing generated question-answer pairs within the question-answer pairs pool by assigned reward value; or updating one or more parameters of the LLM-based natural language generation model to maximize reward value for the generated question-answer pairs.

10. The computerized method of claim 9, wherein the real-world client experience interactions comprises audio or video and the user response scoring module analyzes voice patterns, facial expressions, or body movements in the responses from the client experience associate based using the trained learning reward model.

11. The computerized method of claim 1, wherein tracking user progress comprises recording scores from the user response scoring module and feedback from the user response feedback module from a plurality of training sessions performed by a single client experience associate over time to identify improvement by the single client experience associate.

12. The computerized method of claim 1, wherein the interactive simulation module provides questions in a format selected from the group consisting of a chat interface, a voice interface, and a video interface.

13. A computer system for training client experience associates, the system comprising a processor in communication with a non-transient memory and operable to perform the steps of:

training a large language model (LLM)-based natural language generation model with a plurality of client experience training materials, wherein training comprises:

converting the plurality of client experience training materials into plain text data using a data ingestion and preprocessing module;

partitioning large portions of the plain text data into small portions using a text chunking and partition module and providing the small portions to the LLM-based natural language generation model;

developing curated prompts to the LLM-based natural language generation model using a prompt engineering module;

generating question-answer pairs related to client experience training using a question answer generation module comprising the LLM-based natural language generation model; and evaluating generated question relevance, generated answer quality, and content coverage of the generated question-answer pairs using a question answer evaluation module and removing question-answer pairs having an answer quality score below a selected threshold to create a question-answer pairs pool; and teaching a client experience associate, wherein teaching comprises:

simulating customer interactions using an interactive simulation module and the question-answer pairs pool to pose questions to the client experience associate;

receiving, analyzing, and scoring responses from the client experience associate using a user response scoring module to compare the responses to validated answers from the question-answer pairs pool;

providing feedback to the client experience associate using a user response feedback module based on differences between the responses and the validated answers identified by the user response scoring module; and tracking the client experience associate's progress over time using a user performance tracking module.

14. The computer system of claim 13, wherein the plurality of client experience training materials comprise unstructured document formats.

15. The computer system of claim 13, wherein the plurality of client experience training materials comprise a plurality of formats.

16. The computer system of claim 13, wherein evaluating generated question relevance, comprises:

semantic similarity computation, comprising calculating semantic similarities between the plurality of client experience training materials and the generated questions, and calculating semantic similarities among all pairs of generated questions; and question ranking using a Maximal Marginal Relevance (MMR) algorithm.

17. The computer system of claim 13, wherein evaluating generated answer quality comprises:

providing a second large language model with a generated question-answer pair and policy content from the plurality of client experience training materials referenced by the generated question-answer pair; and prompting the second large language model to grade the generated question-answer pair on relevance, correctness, completeness, informativeness, quality, coherence, and attributability.

18. The computer system of claim 13, wherein evaluating content coverage comprises:

using natural language processing of the plurality of client experience training materials to identify key words and phrases that capture central themes of the plurality of client experience training materials;

identifying topics that are not addressed by the generated question-answer pairs using a comparative analysis between the identified key words and phrases and the question-answer pairs; and prompting the question-answer generation module to produce additional question-answer pairs targeting the identified topics.

19. The computer system of claim 13, wherein the plurality of client experience training materials comprises real-world client experience interactions and interaction survey data from the real-world client experience interactions.

20. The computer system of claim 19, further operable to perform the steps of:

training a supervised learning reward model using the real-world client experience interactions and interaction survey data;

assessing the generated question-answer pairs with the supervised learning reward model to assign a reward value for each generated question-answer pair; and prioritizing generated question-answer pairs within the question-answer pairs pool by assigned reward value.

* * * * *